United States Patent [19]

Kayaert et al.

[11] Patent Number: 5,120,345
[45] Date of Patent: Jun. 9, 1992

[54] PROCESS FOR PRODUCING FERTILIZER GRANULES

[75] Inventors: André F. Kayaert, Overijse, Belgium; Walter Cardon, Sas van Gent, Netherlands

[73] Assignee: Nederlandse Stikstof Maatschappij B.V., Sluiskil, Netherlands

[21] Appl. No.: 627,615

[22] Filed: Dec. 11, 1990

Related U.S. Application Data

[63] Continuation of Ser. No. 182,186, Apr. 15, 1988, abandoned.

[30] Foreign Application Priority Data

Apr. 16, 1987 [NL] Netherlands ............... 8700913

[51] Int. Cl.⁵ .................... C05C 9/00; C05C 13/00
[52] U.S. Cl. ........................... 71/30; 71/63; 71/64.02; 71/64.03; 71/64.05; 71/64.06
[58] Field of Search ................ 71/28-36, 71/63, 64.02, 64.03, 64.05, 64.06

[56] References Cited

U.S. PATENT DOCUMENTS

| | | | |
|---|---|---|---|
| 3,725,029 | 4/1973 | Blackmore | 71/64.12 X |
| 3,738,821 | 6/1973 | Barker | 71/61 X |
| 3,785,796 | 1/1974 | Mann, Jr. | 71/61 X |
| 4,943,308 | 7/1990 | Van Marcke et al. | 71/30 X |

*Primary Examiner*—Ferris Lander
*Attorney, Agent, or Firm*—Scully, Scott, Murphy & Presser

[57] ABSTRACT

A process for producing fertilizer granules containing urea and ammonium sulphate by granulation in a fluidized bed of particles is described. Ammonium sulphate particles are introduced into a fluidized bed and urea is applied to the particles in the fluidized bed by spraying an aqueous urea-containing liquid with a urea concentration of 70-99.9% by weight. Preferably, the aqueous urea solution contains a granulation additive and/or ammonium sulphate.

5 Claims, 1 Drawing Sheet

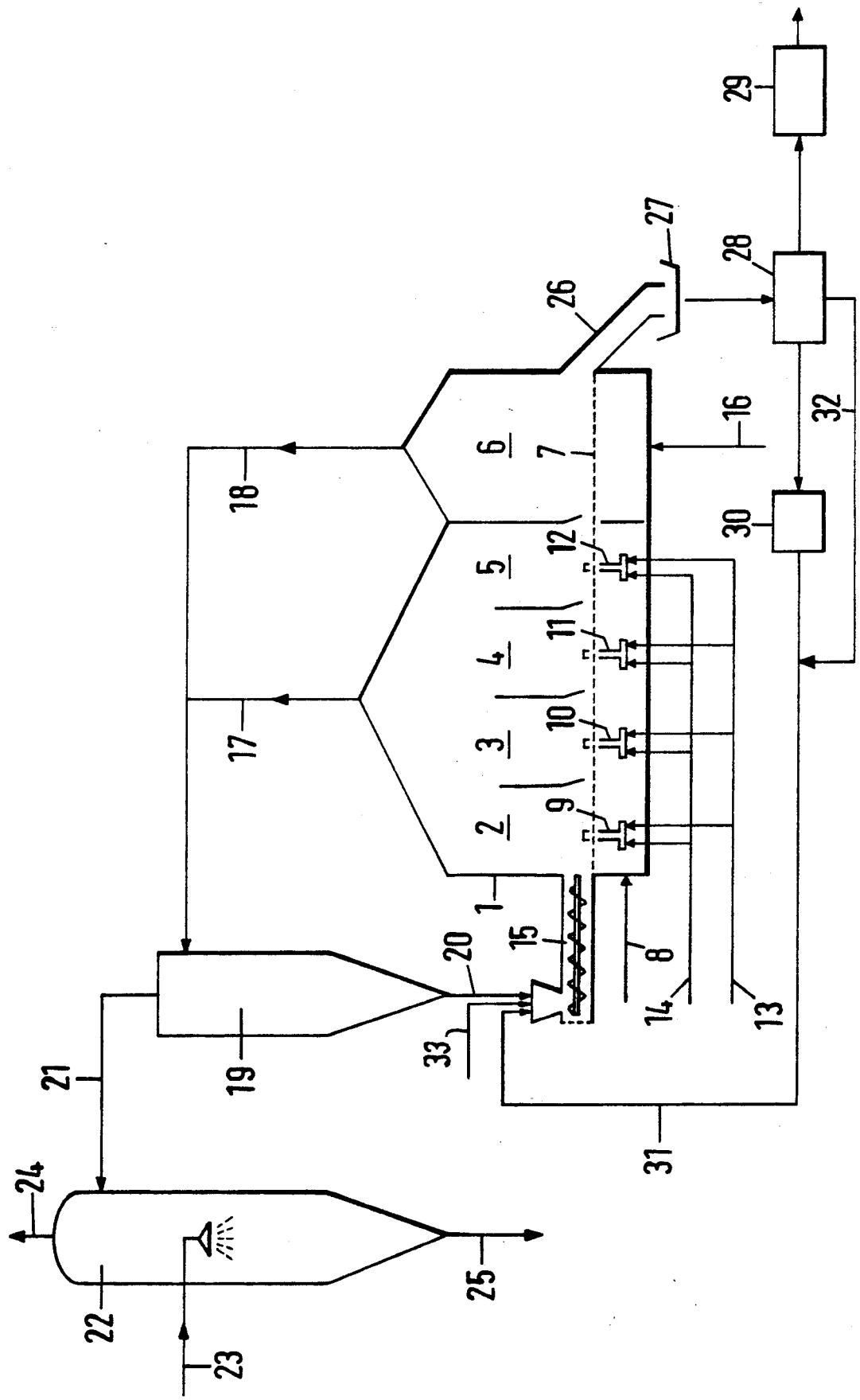

PROCESS FOR PRODUCING FERTILIZER GRANULES

This application is a continuation of application Ser. No. 182,186, filed on Apr. 15, 1988, now abandoned.

This invention relates to a process for producing fertilizer granules containing urea and ammonium sulphate by granulation in a fluidized bed of particles.

The development and production of good nitrogen and sulphur containing fertilizers is at present of very great importance. In former years, ammonium sulphate (21% N, 24% S) was the most important nitrogen-containing fertilizer, and the phosphate fertilizer generally used was superphosphate (20% $P_2O_5$, 12% S). Dressings with these substances gave the soil more sulphur than was needed for the crop. Over the years, however, ammonium sulphate was displaced by urea (46% N, 0% S) and superphosphate by monoammonium phosphate (12% N, 61% $P_2O_5$, 0% S), diammonium phosphate (21% N, 53% $P_2O_5$, 0% S) and triple superphosphate (46% $P_2O_5$, 0% S). Owing to the use of these sulphur-free fertilizers, the sulphur content of the soil decreased, if no separate sulphur dressings were given, because sulphur was removed from the field with every harvest of the crop, while in addition sulphur was lost from the soil from leaching-out processes. The result is that in many parts of the world the soil exhibits at present a serious shortage of sulphur, which for many crops is extremely harmful.

There is, therefore, a great need of fertilizers which contain sufficient sulphur in a form that is readily taken up.

It is known for urea granules to be provided with a coating of elemental sulphur. In this form, however, sulphur is only taken up by the crop extremely slowly. The elemental sulphur must first be converted into sulphate in the soil, and this conversion proceeds very slowly, especially in cold and/or arid regions.

A better sulphur supplier is ammonium sulphate, which makes the sulphur available in a form that can be directly taken up by plants. By itself, ammonium sulphate is less attractive as a fertilizer for fertilizing purposes by reason of its relatively low nitrogen content (21%) and its high sulphur content, but by combining ammonium sulphate with urea in various ratios, it is possible to produce fertilizers with nitrogen and sulphur concentrations suited to specific requirements of crops. Thus, for example, by combining the two components in a urea/ammonium sulphate weight ratio of about 4/1, a fertilizer can be obtained which contains about 40% N and about 5% S, and is very suitable for many fertilizing purposes.

Ind. Eng. Chem., Process Des. Dev. 14 (1975) 269–276 describes the production, on a pilot-plant scale, of urea and ammonium sulphate containing fertilizer granules by pan granulation and by prilling mixtures of a highly concentrated urea solution (about 99%) and ammonium sulphate. The ammonium sulphate is added in the solid form to the substantially anhydrous urea melt, but is only partially soluble therein, so that the urea and ammonium sulphate containing melt must be granulated or prilled at a high temperature (135°–150° C.) to limit the proportion of undissolved ammonium sulphate in the melt as much as possible. At lower temperatures the melt contains so much undissolved material that it cannot be properly processed into granules. Higher temperatures cannot be used in connection with decomposition of the urea and the formation of the harmful by-product biuret. By reason of the limited solubility of ammonium sulphate in the urea melt, the methods described are unsuitable for implementation on an industrial scale.

In an aqueous urea solution, ammonium sulphate is considerably better soluble than in a substantially anhydrous urea melt. Aqueous urea solutions can be processed into granules in the manner described in Netherlands patent 173,714, in which an aqueous urea solution, to which a granulation additive, i.e., a crystallization retarder for the urea, has been added, is sprayed in the form of very fine droplets with an average diameter of less than 120/μm into a fluidized bed of urea granules at a temperature at which the water evaporates from the solution sprayed onto the nuclei, and urea crystallizes on the nuclei to form granules having the desired sizes.

The aqueous urea solution which is granulated in the method described in Netherlands patent 173,714 preferably has a urea concentration of 92–97% by weight, specifically 94–96% by weight, and is sprayed into the fluidized bed at a temperature of 110°–125° C. Ammonium sulphate is considerably better soluble in such solutions than in a substantially anhydrous urea melt, it is true, but not in a proportion that is interesting for making bulk blends, among other purposes.

U.S. Pat. No. 4,500,336 teaches that fertilizer granules can be made by suspending ammonium sulphate particles in an aqueous urea solution, and subsequently granulating this solution. In that process, generally, urea and ammonium sulphate-containing granules are obtained with an ammonium sulphate content of from 15 to 30% by weight.

However, the process described in the US patent last mentioned has some disadvantages. In the first place, the starting product is a suspension of solid particles in a liquid. Although such a suspension can be effectively granulated, in particular when the process described in the patent is applied, the presence of solid particles has the disadvantage that equipment may be more liable to erosion, or that more expensive, wear-resistant materials are required.

Compared with the granulation of pure urea, it has further been observed that the ratio of on-size to off-size product is somewhat more unfavourable, and so is the emission of dust. An improvement of these aspects is therefore very attractive from an economic point of view.

European patent application 86201807.4, filed Oct. 16, 1986, which is not a prior publication, filed October describes a process which comprises dissolving ammonium sulphate in a relatively dilute urea solution, concentrating this solution, with a granulation additive, i.e., a crystallization retarder, being present in the system, and finally granulating the resulting liquid in a fluidized bed. With his process, the desired improvement, outlined above, have been achieved, but there are restrictions as regards the maximum ammonium sulphate content.

It is an object of the present invention to provide a process which, on the one hand, gives a number of advantages over and above the prior-published state of the art, and on the other hand is not limited as regards ammonium sulphate content.

The invention is accordingly characterized by introducing ammonium sulphate particles into a fluidized bed, and applying urea to said particles in the fluidized bed by spraying an aqueous, urea-containing liquid with a urea concentration of 70-99.9% by weight.

The aqueous, urea-containing solution can be sprayed in known manner, for example, as described in U.S. Pat. No. 4,219,589.

During the granulation in the fluidized bed, the granules being built are alternately moistened by the solution being sprayed, and dried, leaving a urea coat containing pores formed by the escaping water vapour. According as more water is to be evaporated from the solution deposited on the granules, the urea coat left contains more pores. The frequent repetition of the alternating moistening and drying processes ultimately results in a porous granule having the desired size, which of course is mechanically weaker in proportion as its porosity is higher. As the porosity of the granule increases with increasing water content of the solution sprayed, the product granules will be mechanically weaker according as the sprayed solution contains more water. In the fluidized bed, the granules being built frequently collide with other granules.

If, during the granulation of urea in a fluidized bed, the urea solution to be sprayed contains a granulation additive, the granules being built in the bed always contain an amount of liquid phase (eutecticum) which keeps the granule surface in plastic condition. Owing to this plasticity, the granule surface is much less prone to be damaged during collisions with other granules than is the case in the absence of the granulation additive so that much less dust is formed. During the countless collisions with other granules, the plastic granule surface is kneaded, so to say, so that granules with a good roundness and a smooth surface are obtained. When the granules are removed from the bed and ultimately cooled, the liquid phase crystallizes in the pores. The granules are then much less porous and consequently stronger than granules obtained in the same way but in the absence of a granulation additive.

The granules are less susceptible to surface wear and have a clearly diminished caking tendency, due to the roundness.

The urea solution is preferably sprayed in the form of very fine droplets with an average diameter of 20-120 μm. Owing to their small size, the droplets can only cover a portion of the surface of the granules being built with a layer of liquid.

The sprayed droplets preferably have an average diameter of 30-60 μm.

The aqueous urea-containing liquid used as the starting product in the method according to this invention may contain up to 30% by weight of water, i.e., the water content of the product of the urea synthesis.

The urea and ammonium sulphate-containing granules in the fluidized bed have sized of between 0.2 and 8 mm and, within this range, may be larger according as larger granules are to be produced.

The temperature of the fluidized bed generally ranges between 80° and 110° C. The temperature of the fluidized bed can be controlled by a suitable selection of the temperatures of the air of fluidization and of the urea solution being sprayed.

The product granules are preferably cooled to a temperature of 20° C. or lower. The product granules can be cooled in any suitable cooler, for example, a fluidized-bed cooler.

In the method according to the invention, the formation of biuret during the granulation can be prevented virtually entirely by spraying a urea solution whose crystallization point is below 100 C. Thus by spraying a urea solution with a urea content of, for example, 75-85% by weight and a biuret content of less than 1.0%, urea and ammonium sulphate granules with a biuret content of less than 1.0% can be obtained. Such granules are particularly desirable for specific crops, such as tobacco and tomatoes.

The urea-containing aqueous solution to be granulated can be a urea solution, or a urea melt. The difference between these is mainly determined by the water content. In the case of water contents of up to about 2.5% by weight, the term "melt" is often used. When larger proportions of water are present, the liquid is generally called a solution. The limit in question is, by itself, rather an arbitrary one. In any case, in principle, any urea and water containing solution can be used with the method according to the invention.

The liquid to be granulated may contain other components in addition to urea and water.

Prior to the granulation, in a given stage of the pretreatment, a granulation additive may be added to the solution, i.e., before, during, or after the addition of the ammonium sulphate or before, during, or after thickening to the desired final concentration. Suitable granulation additives are water-soluble addition and condensation products of urea and formaldehyde (U.S. Pat. No. 4,219,589) and water-soluble inorganic aluminium salts (U.S. Pat. No. 4,500,336).

These substances are generally used in proportions ranging from 0.1 to 2.5, preferably 1.5% by weight, calculated on urea.

It is also possible to incorporate ammonium sulphate in the urea-containing liquid. This may be dissolved in the urea solution or melt, but may also be present as a solid. In these cases one does of course obtain a high sulphur content in the granule, but the other advantages are only present to a lesser extent.

The process according to the invention can be carried out both batchwise and continuously. When used on a commercial scale, a continuous process is of course preferred.

In the practice of the invention, the method in principle comes down to supplying separately prepared ammonium sulphate particles or nuclei with a diameter less than the desired ultimate granule diameter to the fluidized bed instead of the off-size product normally used, that is to say, broken oversized granules. The sieved-off fines are of course returned.

The oversize granules will preferably be processed in either of the two following ways.

The first possibility is for these granules to be broken in known manner and returned as fresh nuclei.

The second possibility is for the oversize granules to be re-dissolved and re-granulated.

The particle size of the ammonium sulphate nuclei preferably ranges from 1 to 4 mm. These diameters give an optimum ratio between desired sulphur content and size of nuclei.

The nuclei can be obtained in various ways; for example by compaction, extrusion, agglomeration, fluid-bed granulation, crystallization, prilling, and the like. As ammonium sulphate is a rather frequently occurring byproduct of all sorts of chemical processes, it is generally not necessary to build a separate plant for it. If this is the case, however, it can be made in a manner comparable to the production of ammonium nitrate, namely, by reacting $NH_3$ and $H_2SO_4$.

The invention also relates to fertilizer granules comprising a core of ammonium sulphate with a surrounding shell containing urea and possibly ammonium sulphate, with the ammonium sulphate content of the granules ranging from 15 to 50% by weight. In case the shell contains ammonium sulphate in addition to urea, the urea content in the shell is at least 70% by weight.

The granules according to the invention can be used as such for fertilizing purposes, but they are in particular very suitable for making compatible, homogeneous fertilizer mixtures (bulk blends) with one or more other kinds of fertilizer granules of the same size. Suitable other kinds of fertilizer granules are phosphate fertilizers, such as monoammonium phosphate, diammonium phosphate, superphosphate, triple superphosphate, and the like. It is also possible to incorporate a potassium fertilizer, such as KCl, in the blend. To prevent segregation, the granule sizes of the components to be blended should be attuned to each other. These bulk blends preferably contain 30 to 50% by weight of the urea and ammonium sulphate containing granules according to the invention. Generally speaking, the aim will be for an S content of approximately 5% by weight in the mixture.

The process according to the invention can be carried out in any type of fluidized-bed granulator. One example of a suitable plant is shown diagrammatically in the accompanying drawing, in which the granulator 1 is divided into a number of compartments 2, 3, 4, 5 for granulation and a compartment 6 for the subsequent drying of the urea granules. The last compartment is optional, as subsequent drying will only be used if the granules still contain superficial moisture. Provided in granulator 1 is a grid 7 which supports the fluidized bed and permits the passage of air of fluidization, preheated in one or more heaters not shown, and supplied through conduit 8. The space below the grid can be divided into compartments, similarly to the space above it, in which case the air of fluidization is applied to each of these compartments. Granulator 1 is further provided at the bottom with pneumatic sprayers 9, 10, 11, 12 extending to above grid 7. It is also possible to use two or more sprayers for each compartment. Through these sprayers, a solution containing urea and possibly ammonium sulphate, and to which a granulation additive may have been added, which solution is supplied through conduit 13, is sprayed into the granulation compartments 2, 3, 4, 5 with the spraying air supplied through conduit 14. The fluidized bed is formed by nuclei supplied through a conveyor 15, such as a conveyor screw, together with ammonium sulphate nuclei which through conduit 33 may also be supplied to conveyor 15. For the subsequent drying of the granules in compartment 6, granulator 1 is provided with a supply conduit for drying-air.

For the discharge of air and possibly entrained dust particles, granulator 1 is provided with exhaust conduits 17, 18, which are in communication with a cyclone 19, in which particles of a size of about 100-500 μm are separated, which are passed via conduits 20 to conveyor screw 15. Via exhaust 21, the air from cyclone 19 is passed to a device 22 in which it is washed with a dilute urea solution. To achieve a high washing efficiency, water can be sprayed into the air through a sprayer 23. The air stripped of dust can escape through exhaust 24, and the dilute urea solution formed is discharged through conduit 25.

Granulator 1 is further provided with a bottom outlet 26 for the granules, which terminates over a vibratory chute 27, whence the granules are transported to a screening device 28, in which they are separated into a number of fractions, namely, a fraction of undersize granules, a fraction of the desired sizes and a fraction of oversize granules. The fraction having the desired sizes is passed through a cooler 29 to storage. If desired, the cooler may be disposed upstream of the screening device. The fraction of oversize granules separated in screening device 28 is, in one embodiment, after cooling transported to a crusher 30, in which they are crushed to the same sizes as, or smaller sizes than, those of the undersize screening fraction. In another embodiment, the fraction of oversize granules is passed to a dissolving section not shown, in which the fraction is processed into a solution containing urea and ammonium sulphate, which can be re-granulated. Through conduit 32, the fraction of undersize granules separated in screening device 28 is passed to conduit 31, in which it is passed to conveyor screw 15, optionally together with the fraction obtained from crusher 30.

The process according to the invention can be carried out both continuously and batchwise. Through conduit 13, a urea containing solution is supplied, and, by means of the air supplied through conduit 14, sprayed, through sprayers 9, 10, 11, 12, into the fluidized bed of nuclei in compartments 2, 3, 4, 5 of granulator 1. The quantity of granules removed from the fluidized bed through compartment 6, into which no solution is sprayed, and discharge conduit 26 is replaced by nuclei supplied through conveyor screw 15.

The size of the product granules depends on a number of factors, such as the number of nuclei in the fluidized bed, the size of these nuclei, the amount of liquid sprayed per unit of time, and the residence time of the nuclei in the bed. Thus, for example, larger product granules will be obtained, if the number of nuclei in the fluidized bed is reduced and the residence time increased. To maintain a given granule size distribution of the product, it is necessary for the bed contents to be kept as constant as possible as regards both the granule size distribution and the number of nuclei. This can be achieved by ensuring that the quantity by weight of the nuclei to be added to the fluidized bed, with the correct granule size distribution, is always attuned to the quantity by weight of the product granules discharged from the bed.

Owing to the sub-division of the fluidized bed into compartments, a fractionation of the granules being built can be achieved.

The invention is illustrated in and by the following examples.

Example 1

Process in which the separately prepared ammonium sulphate particles serving as nuclei were produced by compaction.

Ammonium sulphate crystals <2 mm were pressed between two rollers at a pressure of 1.4 tonne/cm to form flakes having a thickness of 2.0 mm. These flakes were broken and screened. The fraction of 1.6-4.0 mm was introduced into the fluid-bed granulator as core material or nuclei. The ammonium sulphate nuclei were sprayed in the fluid-bed granulator with a 97% urea solution containing 1% of UF 80 (reaction product of urea and formaldehyde) as a granulation additive. The granulation temperature was 108°-110° C. The ratio by weight of ammonium sulphate nuclei/urea was 40/60.

EXAMPLE 2

The same test as Example 1, but in which 1% $Al_2(SO_4)_3$ was used as the granulation additive.

EXAMPLE 3

Process in which the individually produced ammonium sulphate particles serving as nuclei were produced by extrusion.

Ammonium sulphate powder (spray-dried), moistened with 5% water was introduced between two rollers. One roller was internally hollow and provided with a perforate wall (perforation dia. 2.5 mm). The ammonium sulphate was passed through this perforation to the interior of the roller. In the interior of the roller, the ammonium sulphate rods were removed by means of a scraper. The extruded ammonium sulphate nuclei were sprayed in the fluid-bed granulator with a 97% urea solution containing 1% UF 80 as a granulation additive. The granulation temperature was 108°–110° C. The weight ratio of ammonium sulphate nuclei to urea was 40:60.

EXAMPLE 4

The same test as Example 3, but in which the weight ratio of ammonium sulphate nuclei to urea was 50/50.

Details of process parameters and product quality are specified in the following table.

TABLE

| Example No. | 1 | 2 | 3 | 4 |
|---|---|---|---|---|
| Test parameters | | | | |
| Preparation of nuclei | | | | |
| Method | compacting | compacting | extrusion | extrusion |
| Particle size nuclei, mm | 1–2 | 1–2 | 1.5–2.5 | 1.5–2.5 |
| Fluid-bed granulation | | | | |
| Concentration urea solution, % | 96.8 | 97.2 | 96.5 | 96.3 |
| Granulation additive | abt. 1% UF 80 | abt. 1% $Al_2(SO_4)_3$ | abt. 1% UF 80 | abt. 1% UF 80 |
| Granulation temperature, °C. | 108–110 | 108–110 | 108–110 | 108–110 |
| Weight ratio ammonium sulphate/urea | 40/60 | 40/60 | 40/60 | 50/50 |
| Final product quality | | | | |
| Appearance of granules | | | | |
| Surface | smooth | smooth | smooth | smooth |
| Roundness | round | round | round | round |
| Chemical characteristics | | | | |
| Moisture KF, % | 0.14 | 0.12 | 0.16 | 0.20 |
| $(NH_4)_2SO_4$, % | 39.5 | 40.2 | 40.5 | 51 |
| UF 80, % | 0.61 | — | 0.65 | 0.53 |
| $Al_2(SO_4)_3$, % | — | 0.65 | — | — |
| Biuret, % | 0.83 | 0.75 | 0.78 | 0.61 |
| total N, % | 36.3 | 36.0 | 36.0 | 33.4 |
| Physical characteristics | | | | |
| Crushing strength dia. 2.5 mm, kg | 3.3 | 3.4 | 2.9 | 3.0 |
| Density, Hg, g/cm$^3$ | 1.39 | 1.39 | 1.36 | 1.38 |
| CRH at 20° C. | 29 | 28 | 29 | 30 |

We claim:

1. A process for producing fertilizer granules containing urea and ammonium sulphate by granulation in a fluidized bed of particles, characterized by introducing separately prepared ammonium sulphate particles into a fluidized bed and applying urea to said particles in the fluidized bed by spraying a solution of water and urea wherein said solution has a urea concentration of 70–99% by weight.

2. A process as claimed in claim 1, characterized by making fertilizer granules with an ammonium sulphate content of 15–50% by weight.

3. A process as claimed in claim 1, wherein said solution of water and urea also contains a granulation additive.

4. A process as claimed in claim 1, characterized by using ammonium sulphate particles having particle size ranging from 1 to 4 mm.

5. A process as claimed in claim 1, characterized in that the temperature in the fluidized bed ranges from 90° tot 115° C.

* * * * *